METHOD AND APPARATUS FOR INSTALLING FLOW LINES AND THE LIKE IN UNDERWATER WELL INSTALLATIONS

Original Filed March 9, 1965 7 Sheets-Sheet 1

INVENTORS
William W. Word, Jr. &
Michael A. Walker

BY Arnold & Roylance
ATTORNEYS

INVENTORS
William W. Word, Jr. &
Michael A. Walker
BY Arnold Ed Longanecker
ATTORNEYS INVENTORS
William W. Word, Jr. &
Michael A. Walker
BY Arnold and Rogers
ATTORNEYS INVENTORS
William W. Word, Jr. &
Michael A Walker
BY Arnold and Rogers
ATTORNEYS INVENTORS
William W. Word, Jr. &
Michael A. Walker
BY Arnold and Roylance
ATTORNEYS INVENTORS
William W. Word, Jr. &
Michael A. Walker
BY Arnold and Roylance
ATTORNEYS

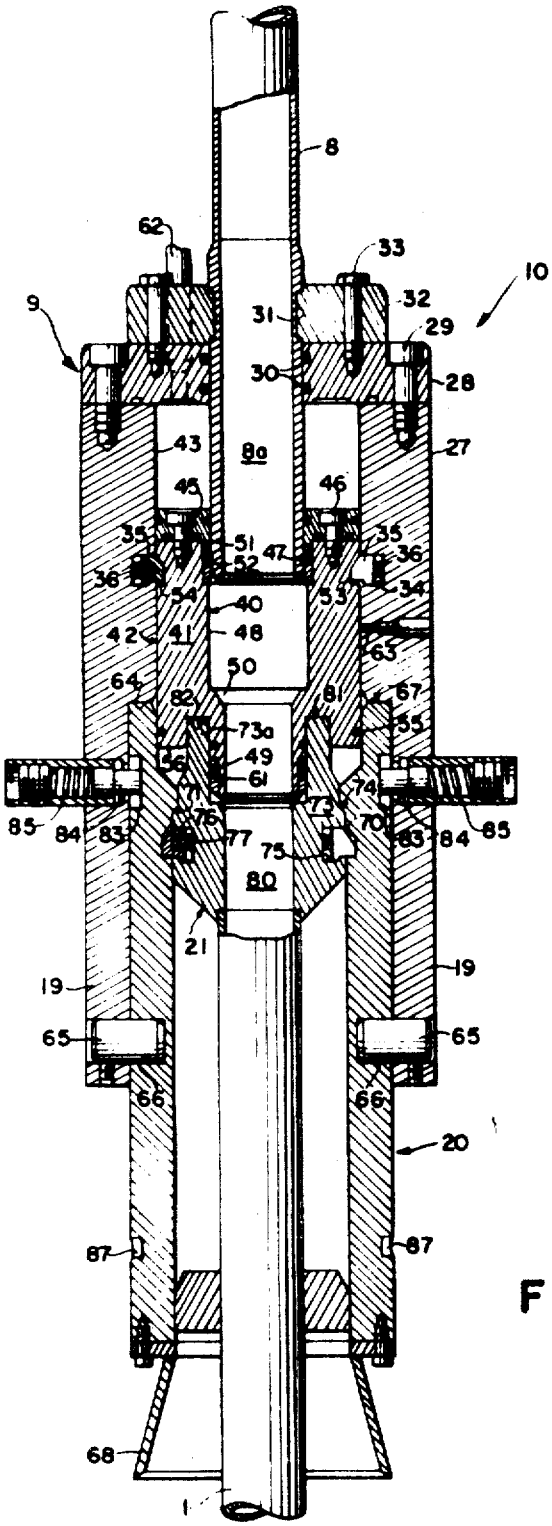
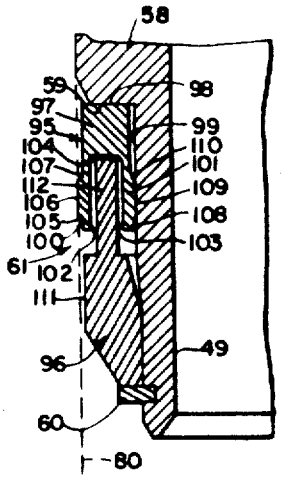
FIG. 11.
FIG. 8.
INVENTORS
William W. Word, Jr. &
Michael A. Walker
BY Arnold, Rogers
ATTORNEYS United States Patent Office Re. 26,668
Reissued Sept. 30, 1969

26,668

METHOD AND APPARATUS FOR INSTALLING FLOW LINES AND THE LIKE IN UNDERWATER WELL INSTALLATIONS

William W. Word, Jr., and Michael A. Walker, Houston, Tex., assignors to Armco Steel Corporation, Middletown, Ohio, a corporation of Ohio Original No. 3,336,975, dated Aug. 22, 1967, Ser. No. 438,294, Mar. 9, 1965. Application for reissue Nov. 27, 1967, Ser. No. 694,761

Int. Cl. E21b *7/12;* F16l *55/00*

U.S. Cl. 166—.5 18 Claims

Matter enclosed in heavy brackets [ ] appears in the original patent but forms no part of this reissue specification; matter printed in italics indicates the additions made by reissue.

*ABSTRACT OF THE DISCLOSURE*

A method and apparatus are disclosed for installing flow lines in *underwater installations such as* well installations of the type wherein the wellhead is located at a substantial distance beneath the surface of a body of water. A flow line connector is provided at the wellhead for installation of the wellhead and comprises a stationary connector portion, which communicates with the well tubing, and a movable connector portion which can be swung from an initial upright position to a laterally projecting position. After installation of the wellhead, the flow line is initially supported on a vessel at the surface of the body of water and in the location generally above the wellhead. The end of the flow line is lowered to the wellhead and connected to the upwardly opening movable portion of the flow line connector unit. The flow line is then laid on the floor of the body of water by moving the vessel away from the location of the well while paying out the flow line, so that the resultant movement of the flow line toward the floor of the body of water causes the movable connector portion to swing into its laterally projecting position. The movable portion of the flow line connector is then locked to the stationary portion and, with the parts in this position, the connector unit establishes communication between the well tubing and the flow line.

This invention relates to the art of installing wells under water and, more particularly, to methods and apparatus for installing flow lines in connection with wells which are equipped with a wellhead located at a substantial distance below the surface of a body of water.

Though the problem of successfully establishing wells in offshore locations has received considerable attention in recent years, and has resulted in numerous innovations in both methods and equipment, prior-art workers have as yet found no fully satisfactory solution to the problem of remotely [insallating] *installing* the flow lines necessary for production of oil, gas or other fluids from the well. The fact that the well may involve a wellhead installed at depths of hundreds or even thousands of feet generates problems which are unique and, in comparison with corresponding operations carried out on dry land, unusually difficult. Thus, on the one hand, it is impractical to attach the flow line to the wellhead, for example, by means of a connector device requiring movement laterally of the wellhead, since lateral or horizontal movements at the wellhead cannot be accomplished accurately from a remote operational base, such as a floating vessel, above the wellhead. On the other hand, the flow line should extend laterally from the wellhead both to avoid abrupt bends and to allow the Christmas tree assembly, for example, to be removed without disturbing the flow line.

A general object of the invention is accordingly to provide a practical method and means for installing flow lines in an underwater well installation, with installation being carried out from the surface of the body of water and with the installed flow line ultimately extending laterally of the well.

Another object is to devise an improved remotely operated flow line connector.

A further object is to devise a method and means for installing flow lines, from a remote position above the well, utilizing the conventional guidance systems for accomplishing delivery of the end of the flow line to the location of the wellhead, yet operating in such fashion that the flow line can be laid on the floor of the body of water and will extend laterally from the wellhead.

Yet another object is to devise equipment which can be guided accurately to an underwater installation site by conventional guide lines and, after initial installation, separated from the guide lines in order that the equipment can be manipulated without hindrance by the guide means.

A still further object is to provide a connector which can be manipulated remotely to attach a conduit or the like to a well installation and which is positively held in an initial predetermined position, until a preliminary operation has been accomplished, and is then moved to and secured in a second predetermined position suitable for normal operations involving the conduit or the like.

In order that the manner in which the foregoing and other objects are attained in accordance with the invention can be understood in detail, particularly advantageous embodiments thereof will be described with reference to the accompanying drawings, which form a part of this specification, and wherein:

FIG. 8 is a sectional view taken on line 8—8, FIG. 7;

FIG. 11 is an enlarged sectional view, taken on line 11—11, FIG. 10, illustrating a metal-to-metal seal device employed in the flow line connector device of FIGS. 5–8;

Broadly stated, the method embodiments of the invention involve delivery of the end of the flow line downwardly from an operational base, such as a floating vessel, to the submerged wellhead or like point of connection of the flow line to the well, with the end portion of the flow line extending vertically as it is lowered, followed by laying of the flow line on the bottom or floor of the body of water and utilization of the resulting translatory movement of the end portion of the flow line, from its initial upright position to its final horizontal position, to effect the precise adjustment of a flow line connector, to which the end of the flow line is attached, necessary to properly align the flow line end for sealed communication with a well pipe. The downward delivery of the flow line end to the submerged point of connection is accomplished with the assistance of the usual guide system operating to guide equipment in travel between the operational base and the wellhead, all association between the flow line end and the guide system being effectively terminated once the flow line has been attached to the connector device. In particularly advantageous embodiments, a flow line connector device is employed which includes a first, stationary structure having a flow duct connected by suitable conduiting to the well pipe, and a second structure which is movable from an initial upwardly opening position, for receiving the downwardly [delievered] *delivered* flow line end, to a final position in which the flow line end projects generally laterally of the well and can be placed in sealed communication with the flow duct of the stationary connector structure.

Figures 1, 12, 13:
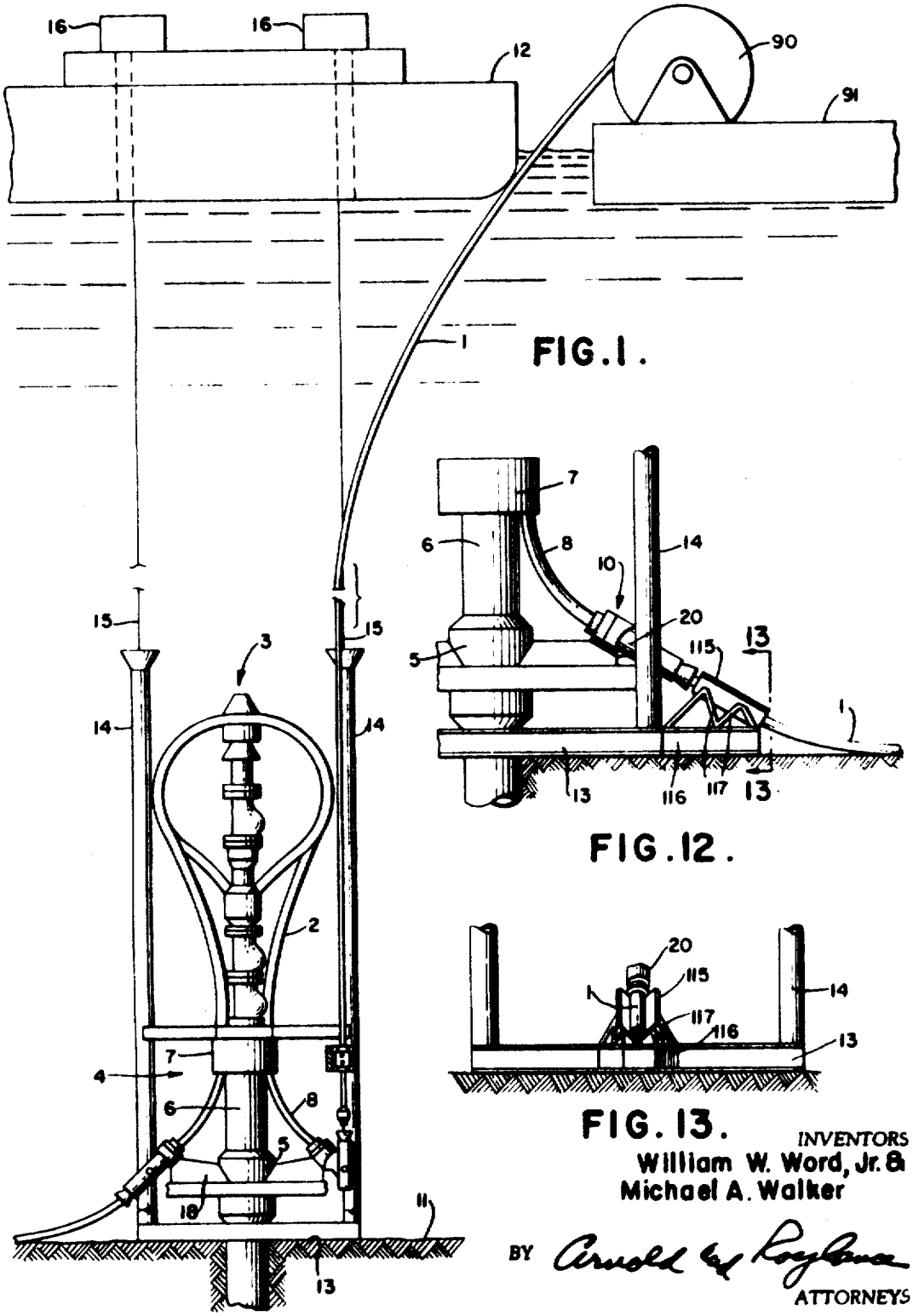
FIGS. 1 and 2 are semi-diagrammatic elevational views illustrating successive steps in installing a flow line in connection with an underwater wellhead in accordance with the method of the invention.
FIG. 12 is a fragmentary side elevational view illustrating a wellhead generally in accordance with FIGS. 1–11, but with an additional support carried by the guide means base for positioning a flow line adjacent the wellhead.
FIG. 13 is a sectional view taken on line 13—13, FIG. 12.
Figure 2:
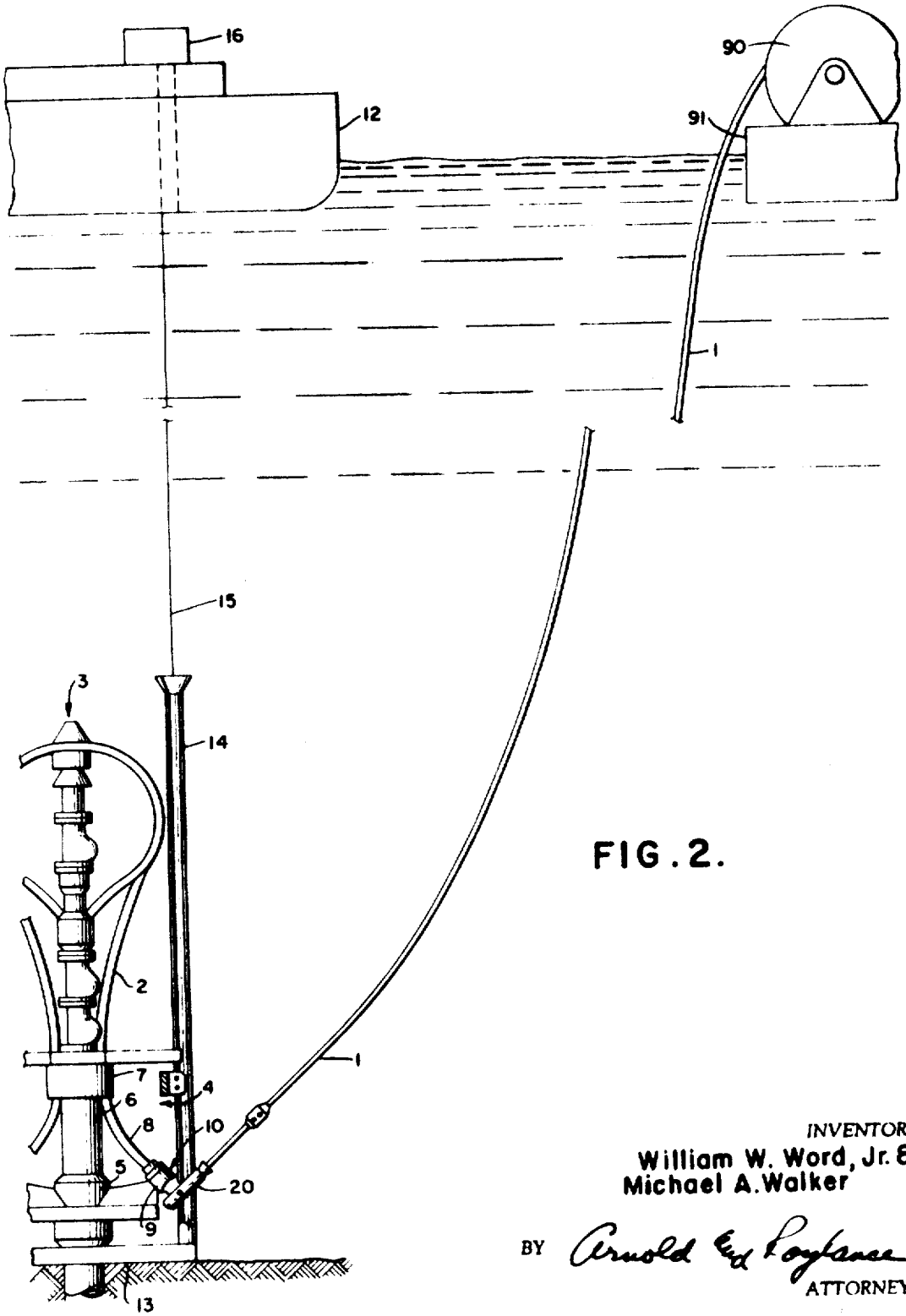
Figure 3:
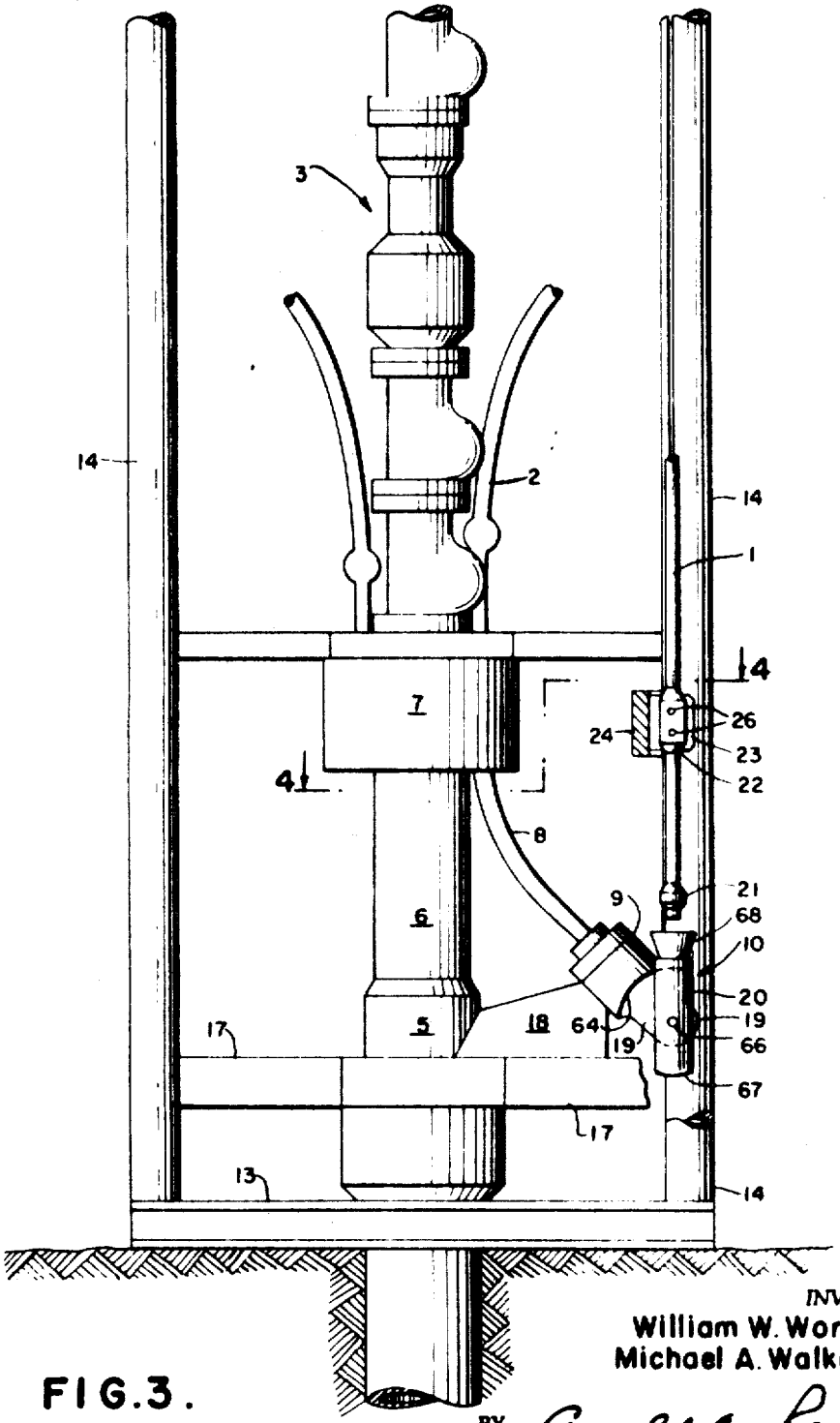
FIG. 3 is a side elevational view of a wellhead installation embodying a flow line connector in accordance with one embodiment of the invention and illustrating the flow line receptacle of the connector in its initial upwardly opening position, with the end of the flow line approaching the receptacle preparatory to being secured therein.

Referring now to the drawings in detail, and first to FIGS. 1 and 2, considered in view of FIG. 3, the invention is illustrated as carried out to accomplish connection of an end of flow line 1 to a well pipe via the appropriate flow conduit 2 of the Christmas tree assembly 3 of a dual string wellhead installation indicated generally at 4. The wellhead installation is advantageously of the type described in U.S. patent application Ser. No. 302,993, filed Aug. 19, 1963, by William W. Word, Jr., and includes an upright well member 5 which supports a production body 6. Body 6 supports the Christmas tree assembly 3 and is secured thereto by a remotely operated coupling 7 which can be of the type described in U.S. patent No. 3,228,715, issued Jan. 11, 1966, to Claude R. Neilon, Michael A. Walker and William W. Word, Jr. Flow conduit 2 is connected, by duct means extending through cooperating flanges of body 6 and coupling 7, to a conduit 8 which extends downwardly from coupling 7, commencing adjacent to the lateral surface of body 6 and curving downwardly and outwardly to terminate within the stationary portion 9 of a flow line connector device indicated generally at 10 and described in detail hereinafter with reference to FIGS. 4–11.

The wellhead installation 4 is located at the bottom or floor 11 of a body of water, such as the sea, a substantial distance below the operational base, which can be a vessel 12 floating at the surface of the body of water. The wellhead installation includes a rectangular guide means base 13 including four parallel upright guide tubes 14, the guide tubes projecting upwardly each from a different corner of the base and being spaced by equal radial distances from the centrally located well member 5. An elongated guide member 15, in the nature of a length of cable or tubing, extends from within each tube 14 to a constant tension winch 16 carried by vessel 12. The guide means base, the guide tubes 14, the guide members 15, and associated guiding equipment can be constructed and arranged in the general manner described in U.S. Patents 2,808,229, issued Oct. 1, 1957, to Robert F. Bauer et al., and 3,143,171, issued Aug. 4, 1964, to L. G. Otteman et al. for example, the purpose of such guide systems being to allow equipment to be delivered to the wellhead and properly installed by operations carried out from the vessel or other operational base, without diver assistance. It will be understood that the guide tubes 14 are provided with vertical slots to accommodate guide arms which are carried by the equipment to be guided into place at the wellhead, the guide arms terminating at their outer ends in sleeve elements slidably embracing the respective guide members 15 and of such dimension as to fit slidably within the appropriate guide tube. Thus, the lower wellhead member 5 is equipped with radially extending guide arms 17 which cooperate with the guide members 15 and tubes 14 to center member 5 relative to the subadjacent elements of the wellhead assembly.

The stationary portion 9 of flow line connector 10 is rigidly mounted on the combination of member 5 and two of the guide arms 17, as by being welded to plates 18 which are in turn welded to member 5 and the guide arms 17. Portion 9 is cylindrical and disposed with its axis extending outwardly away from the wellhead and, depending on the particular installation, slanting downwardly at an angle which can be as great as 45°, for example. At its outer end, portion 9 is equipped with transversely spaced, longitudinally projecting parallel legs 19 which pivotally support a flow line receptacle 20. As described in greater detail hereinafter, the receptacle 20 is arranged to pivot, about an axis transverse to portion 9, between the upright position seen in FIG. 4 and a position in which the receptacle is coaxially aligned with respect to portion 9. When in its upright position, the receptacle 20 opens upwardly to receive the end of the flow line.

Figure 4:
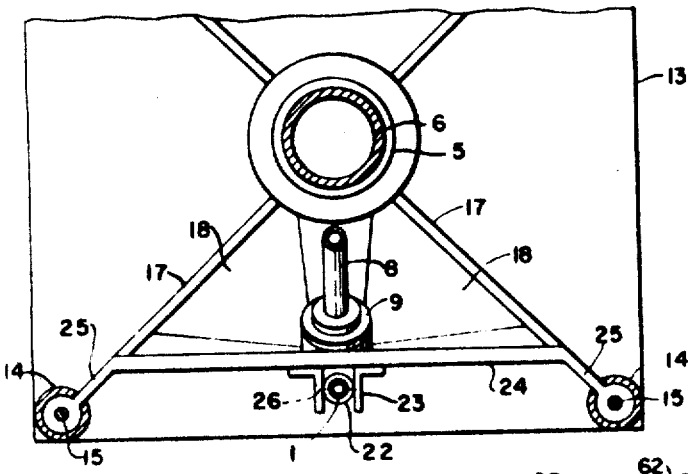
FIG. 4 is a horizontal sectional view taken on line 4—4, FIG. 3.

A fitting 21 is secured rigidly to the end of flow line 1 and, as later described, is constructed to be inserted downwardly into the receptacle 20 to be secured thereto by automatic latch elements. At a point spaced from fitting 21 by a distance greater than the length of the receptacle 20, a sleeve 22, FIGS. 3 and 4, is rigidly secured to the flow line. Sleeve 22 cooperates with yoke members 23 carried by a bar 24 having guide arms 25 arranged to cooperate with two of the guide elements 15 and with the appropriate two of the guide tubes 14. Sleeve 22 is initially secured rigidly to yoke members 23, and thus to bar 24, by vertically spaced shear pins 26, FIGS. 3 and 4. The location of yoke members 23 on bar 24 is such that when the guide arms 25 are associated with the proper guide members 15, and enter the corresponding tubes 14, fitting 21 and the end portion of the flow line are aligned coaxially with receptacle 20, assuming the receptacle to be in the upright position seen in FIG. 1. Thus, when bar 24 is fully lowered, fitting 21 is inserted in receptacle 20.

Referring now to FIGS. 5–8, portion 9 comprises a tubular cylindrical housing member 27 which is open at one end, the other end being closed in fluid-tight fashion by a circular end plate 28 secured to member 27, as by screws 29. End plate 28 has a central opening which accommodates the lower end portion of conduit 8, a fluid-tight seal being provided between the end plate and the conduit, as by O-rings at 30. The end portion 8a of conduit 8 is of increased wall thickness, as compared to the conduit proper, and is straight, extending coaxially into housing member 27 and terminating in a free tip intermediate the ends of the housing member. Adjacent end plate 28, conduit portion 8a is provided with an outwardly opening transverse annular groove 31 in which is snugly engaged the inner peripheral portion of an annular locking ring 32 which is fixed to end plate 28 by screws 33. Accordingly, conduit portion 8a is rigidly secured against axial movement relative to member 27.

At a point spaced a substantial distance from end plate 28, member 27 is provided with a transverse annular inwardly opening groove 34 which accommodates a circular series of locking segments 35. Biased radially inwardly, as by springs 36, FIG. 8, segments 35 each have an arcuate inner face 37, a cam face 38 which slants inwardly toward the free end of the member 27, and a flat face 39 extending transversely of member 27.

Figure 5:
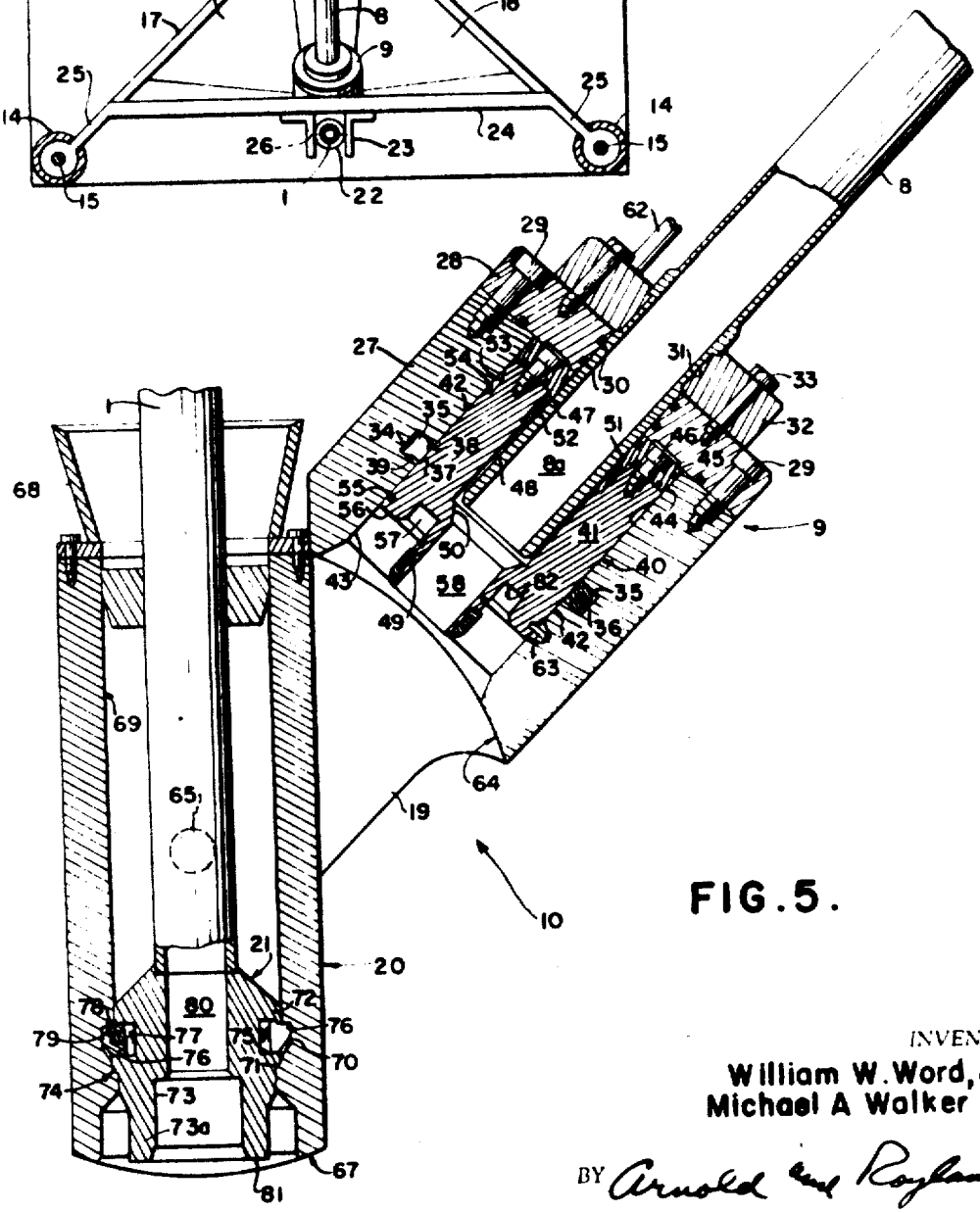
FIG. 5 is a vertical sectional view of the flow line connector device of the wellhead installation of FIG. 3, showing the flow line receptacle in its initial upright position with the end of the flow line secured therein.
Figure 9:
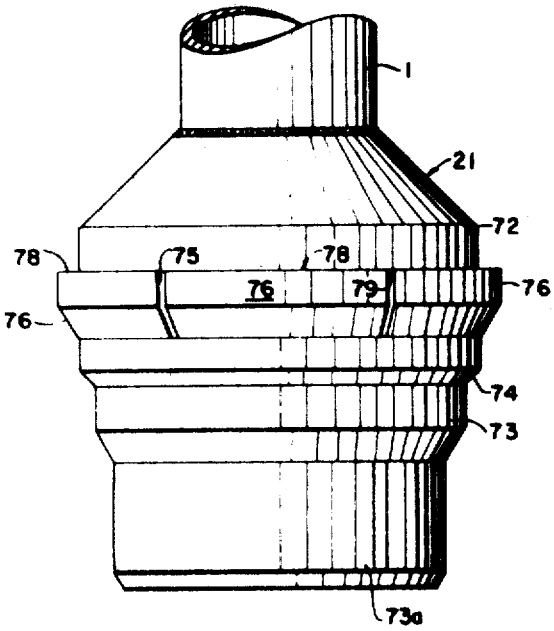
FIG. 9 is a side elevational view of a flow line end fitting in accordance with the invention.
Figure 6:
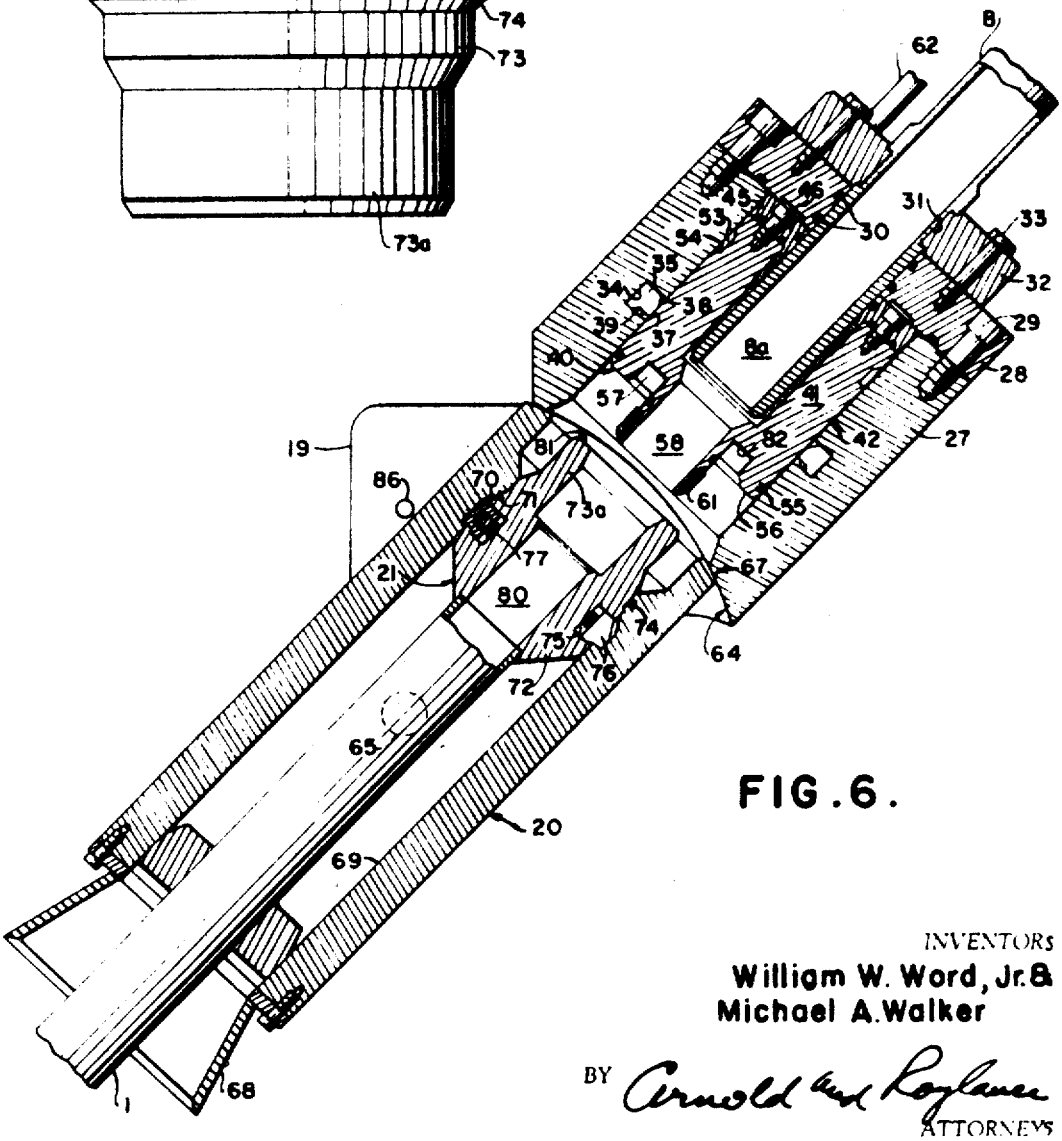
FIG. 6 is a view similar to FIG. 5 but showing the flow line receptacle in its second position, preparatory to establishment of a sealed joint at the end of the flow line.
Figure 10:
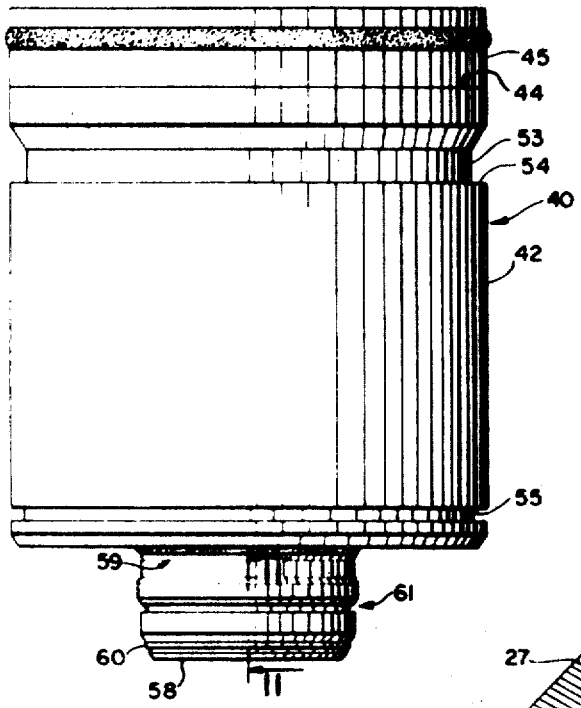
FIG. 10 is a side elevational view of a pressure fluid-actuated seal cylinder in accordance with the invention.
Figure 7:
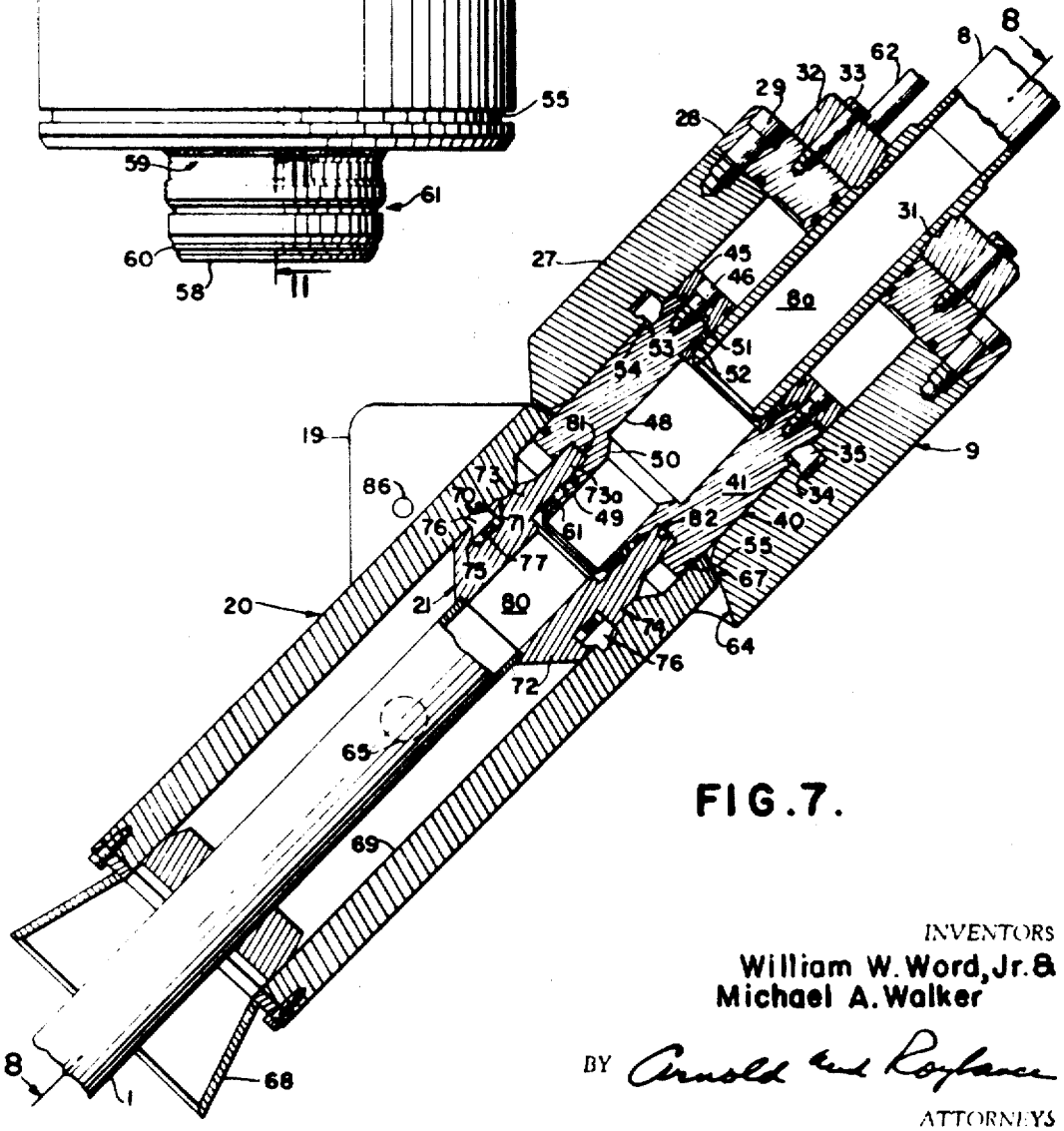
FIG. 7 is a view similar to FIG. 6, but illustrating the various parts of the connector device in positions such as to connect the flow line to the wellhead installation in fluid-tight fashion.

An annular seal piston, indicated generally at 40, FIGS. 5 and 10, is disposed within member 27. Piston 40 includes a main body 41 having an outer cylindrical surface 42 and a cylindrical through bore. Outer surface 42 of body 41 is slidably embraced by the inner cylindrical surface 43 of member 27. The inner end portion of the piston body terminates in a transverse annular end face 44 which is directly engaged by a ring 45 secured to body 41, as by screws 46. Ring 45 completely fills the annular space between conduit portion 8a and surface 43 and is provided with inner and outer grooves which retain O-rings providing fluid-tight seals between ring 45 and elements 8a and 27, as will be clear from FIG. 5. O-rings, or other suitable seals, are also provided between body 41 and ring 45.

Commencing at the end of body 41 adjacent ring 45, the through bore of body 41 includes in axial succession a cylindrical portion 47, of substantially larger diameter than conduit portion 8a, a longer intermediate cylindrical portion 48 which is of larger diameter than conduit portion 8a but smaller than bore portion 47, and a cylindrical tip portion 49 of a diameter smaller than the outer diameter of conduit portion 8a. The combined axial dimensions of ring 45 and bore portions 47 and 48 are such that, when ring 45 engages end plate 28, the free tip of conduit portion 8a is spaced slightly toward end plate 28 from the shoulder 50 which joins bore portions 48 and 49.

At its inner periphery, ring 45 is provided with an annular axially directed projection 51 which extends into the annular space between bore portion 47 and conduit portion 8a. A two-part annular metal-to-metal seal 52 of a type described hereinafter and disclosed and claimed in copending application Ser. No. 428,318, filed Jan. 27, 1965, by Edward A. Castor, is engaged between the tip of projection 51 and the shoulder between bore portions 47 and 48 to provide a fluid-tight seal between conduit portion 8a and body 41.

At the end portion of body 41 adjacent ring 45, outer surface 42 is interrupted by a transverse annular outwardly opening groove 53 having a flat transverse wall 54 which faces ring 45, groove 53 being dimensioned to accommodate the inner tip portions of segments 35. A transverse annular outwardly opening groove 55 is provided adjacent the opposite end of body 41. Adjacent groove 55, body 41 terminates in a transverse annular end face 56. An axially extending annular recess 57, concentric with the through bore of the piston body, is disposed between end face 56 and an axially extending projection 58. As seen in FIGS. 10 and 11, projection 58 has a transverse annular shoulder 59 which faces the tip of the projection, and a transverse annular groove which accommodates a retaining ring 60 adjacent the tip, a two-part metal-to-metal annular seal device 61 being engaged between ring 60 and shoulder 59. When ring 45 engages end plate 28, the end of tip portion 58 of the piston is spaced inwardly from the open end of housing member 27. On the other hand, piston 40 can be moved axially away from end plate 28, so as to project from the open end of member 27. To accomplish such movement, pressure fluid is supplied to the interior of member 27 via a suitable conduit 62, FIG. 5, which opens through end plate 28. Prior to establishing connection of flow line 1 to conduit 8, piston 40 is retained in fully retracted position, with ring 45 engaging end plate 28, by a plurality of shear pins 63, FIG. 5, carried by member 27 and engaged in groove 55. Opposite end plate 28, housing member 27 is provided with an end surface 64 which extends cylindrically about a transverse axis determined by a pair of transversely aligned pivot pins 65 each fixed to a different one of the legs 19.

Receptable 20 is in the form of a cylindrical tube having an outer diameter slightly smaller than the transverse spacing between legs 19. The receptacle has a pair of transversely aligned cylindrical recesses 66, the pins 65 each being engaged in a different one of the recesses 66 so that the receptacle is supported for pivotal movement, about the axis defined by pins 65, between the upwardly opening position seen in FIG. 5 and the position seen in FIG. 7, in which the receptacle 20, conduit portion 8a, piston 40 and housing member 27 are all coaxial. At one end, receptacle 20 has an end surface 67 which extends cylindrically about the axis defined by pins 65 and recesses 66. The radial distance from such axis to surface 67 is only slightly smaller than that from the axis to surface 64 so that, when the receptacle 20 is in the coaxially aligned position of FIG. 7, surfaces 64 and 67 are concentric and closely adjacent. At the other end, receptacle 20 is provided with an outwardly flaring guide funnel 68 which leads to the mouth of a through bore 69. Bore 69 is defined for most of its length by a right cylindrical surface but, near end surface 67, includes a transverse annular groove 70 and a frustoconical shoulder 71 which tapers inwardly toward end surface 67.

Fitting 21, secured to the end of flow line 1, as by welding, has a larger portion 72 with an outer diameter only slightly smaller than the diameter of bore 69 so that, on passing downwardly through funnel 68, the fitting is slidably received by bore 69. The tip portion of fitting 21 includes a portion 73 of a diameter to fit snugly within the smaller diameter portion 69a of the bore of receptacle 20. Portions 72 and 73 join at a frustoconical transverse annular shoulder 74 disposed to seat on shoulder 71 when fitting 21 has been fully inserted. The remainder of the tip portion, indicated at 73a has an outer diameter distinctly smaller than the portion of bore 69 which surrounds portion 73a when shoulders 71 and 74 are engaged. A transverse annular outwardly opening groove 75 is provided in portion 72 of the fitting and accommodates a circular series of arcuate locking segments 76 which are biased outwardly, as by springs 77. Segments 76 have tapered faces which slant toward tip 73, so that the segments are biased inwardly to retracted positions as the fitting enters bore 69. The location of groove 75 relative to shoulder 74 is such that, when shoulders 74 and 71 engage, grooves 75 and 70 are aligned and segments 76 therefore snap outwardly to engage in groove 70 and lock fitting 21 against removal from receptacle 20. In this connection, it is to be noted that the flat faces 78 of segments 76 directed away from tip 73 lie in a common transverse plane, and the wall 79 of groove 70 directed toward shoulder 71 is flat and transverse, so that, with segments 76 engaged in groove 70, engagement of faces 78 with wall 79 fixes fitting 21 rigidly against movement away from end surfaces 67.

Fitting 21 has a through bore 80 forming a continuation of the bore of the flow line. Bore 80 is enlarged, within tip portion 73 of the fitting, to snugly receive the projection 58 of seal piston 40. The radial thickness of the wall of tip portion 73 is only slightly smaller than the radial width of the annular recess 57 so that recess 57 can accommodate the tip of fitting 21. Fitting 21 and piston 40 are so dimensioned, and grooves 34, 53, 70 and 75 so located, that, when the receptacle 20 is coaxial with member 27, fitting 21 engages shoulder 71 and piston 40 is actuated to its projected position, with segments 35 engaged in groove 53, the flat transverse annular end face 81 of fitting 21 is adjacent the bottom wall 82 of annular recess 57. Recess 57 is of significant depth, so that there is good telescopic engagement between the cylindrical inner and outer walls of the recess and the inner and outer surfaces, respectively, of tip portion 73a and, with the parts in the positions seen in FIG. 7, receptacle 20 is held against pivotal movement. In addition, as seen in FIG. 8, receptacle 20 is provided with a pair of transversely aligned recesses 83, near end surface 67, which respectively receive latch pins 84 carried by leg portions 19 and biased inwardly by springs 85. Engagement of pins 84 in recesses 83 holds the receptacle against pivotal movement relative to stationary portion 9 of the connector.

The flow line connector device 10, being secured rigidly to the assembly of guide arms 17 and the well member to which the guide arms are secured, is lowered into place during installation of that well member. At this time, receptacle 20 is disposed in its upright, upwardly opening position, as seen in FIG. 5, with guide funnel 68 extending upwardly and end surface 67 facing downwardly. The receptacle is rigidly retained in such upright position by means of shear pins 86, FIG. 6, carried by legs 19 and engaged in recesses 87, FIG. 8, in receptacle 20. Rigidly secured in its upright position, receptacle 20, once installed, occupies a predetermined position relative to the adjacent ones of guide tubes 14, since the assembly of arms 17 and plates 18 is rigid and since the end sleeves carried by arms 17 are slidably engaged in the guide tubes. The assembly comprising arm 24, guide arm portions 25, yoke members 23 and sleeve 22 is so constructed and dimensioned that, with the end sleeves carried by guide arm portions 25 engaged over the ones of guide elements 15 which extend into the appropriate tubes 14, lowering of bar 24 and guide arm portions 25 will cause fitting 21 to enter receptacle 20 and engage shoulder 71, so that segments 76 spring outwardly into groove 70 and secure fitting 21, and thus the end of flow line 1, to the upright flow line receptacle. At this time, seal piston 40 is retained in its fully retracted position, with ring 45 engaging end plate 28, because shear pins 63 are engaged in groove 55.

At the time the end of flow line 1 is secured to bar 24 by shear pins 26 and sleeve 22, the flow line is coiled on a supporting reel 90 carried by a flow line laying vessel 91, FIG. 1, positioned adjacent the vessel 12 which acts as the operational base at the surface of the body of water. Vessel 91 is maintained immediately adjacent vessel 12 while the assembly comprising bar 24 and sleeve 22 is lowered into place at the wellhead and fitting 21 is installed in receptacle 20. Thereafter, vessel 91 is moved away from vessel 12 in a line generally at right angles to the pivotal axis defined by pins 65, as will be clear from FIG. 2. During such movement, the flow line 1 depends from reel 90 in a portion of a catenary curve between reel 90 and receptacle 20 as the two points of support, and an increasing strain is applied to receptacle 20 tending to pivot the same away from the wellhead. As a result, shear pins 86 are broken so that the receptacle is free to pivot about the axis defined by pivot pins 65, and continued movement of vessel 91 away from vessel 12 causes the receptacle to swing toward the position seen in FIG. 7. Finally, with a substantial portion of the flow line lying on the marine floor 11, the receptacle 20 is coaxial with member 27 and locked in this position by engagement of pins 84 in recesses 83, pressure fluid then being supplied via conduit 62 to drive piston 40 into the sealing position seen in FIGS. 7 and 8, so that fluid can flow from the well via conduit 8, connector device 10 and flow line 1 in a path completely isolated from the water in which the wellhead is submerged.

Seal device 61 is a metal-to-metal, fluid pressure energized seal comprising a metal sealing ring 95 and a rigid follower 96. Ring 95 is circular and has a transverse or radial cross section which is in the form of a U with a base enlarged in a direction parallel to the legs thereof. Thus, the base portion 97, FIG. 11, is of rectangular cross section and includes a flat annular end surface 98 disposed to engage shoulder 59. The radial thickness of base 97 is less than the radial distance between the two surfaces at which seals are to be established, that is, less than the space between the wall of bore 80 and the outer cylindrical surface portion 99 of projection 58. Ring 95 is completed by two concentric circular webs 100 and 101 which are integral with base portion 97 and project from the same end thereof. The adjacent faces 102 and 103 of webs 100 and 102 are parallel and, at the juncture between the webs and base portion 97, are joined by a flat annular face 104. The outer surface of web 100 includes an inwardly tapering frusto-conical tip portion 105, a cylindrical portion 106, and a frusto-conical portion 107 which tapers inwardly toward base 97. Similarly, the inner surface of web 101 includes a frusto-conical tip portion 108, a cylindrical intermediate portion 109, and a frusto-conical portion 110 tapering inwardly from portion 109 toward base portion 97. The outer surface of web 100 and the inner surface of web 101 are identical but reversed relative to each other.

Because of the presence of tapered surface portions 105, 107, 108 and 110, the two cylindrical surface portions 106 and 109 are spaced radially from each other by a distance materially greater than the radial thickness of base portion 97. Further, ring 95 is so constructed that the normal distance between cylindrical surface portions 106 and 109 is greater than the radial spacing between the wall of bore 80 and surface portion 99 of projection 58. Accordingly, when projection 58 is moved into the part of bore 80 defined by portion 73a, there is an interference fit between surface portion 106 and the wall of bore 80, and between surface portion 109 and surface 99.

The sealing ring 95 is forced onto portion 58 and against shoulder 59 with the aid of a rigid follower 96 including a main annular body 111 and a cylindrical axially projecting flange 112 which is of such radial thickness and such diameter as to extend into the space between webs 100 and 101 and engage face 104. Though follower 96 directly embraces projection 58, the radial thickness of the follower is less than the radial space between projection 58 and the wall of bore 80, and fluid can therefore pass follower 96 and enter the annular space between webs 100 and 101 to [enrgize] *energize* the sealing ring.

Because of the presence of tapered surface portions 107 and 110, webs 100 and 101 are thinner adjacent base portion 97 than in the adjacent portions of the webs. Accordingly, the webs of the sealing ring are capable of being flexed outwardly, under the action of fluid pressure within the space between the webs, to establish increasingly effective seals with the wall of bore 80 and with surface portion 99 of projection 58, as the fluid pressure against which the seal is to be effective builds up.

Seal device 52 is essentially the same as seal device 61 and functions in the same manner just described.

Since pivotal movement of the flow line receptacle 20 relative to the stationary connector structure 9 is accomplished by moving vessel 91 to manipulate the flow line, the only direct remote actuation required is actuation of the seal piston 40, accomplished by supplying pressure fluid via conduit 62. The supply of pressure fluid can be via a control unit (not shown) installed at the wellhead, or directly from the operational base 12, as desired in the particular case.

FIGS. 12 and 13 illustrate a modified form of the invention including means fixedly mounted relative to the wellhead for supporting the end portion of the flow line, adjacent connector device 10, once the flow line has been laid on the ocean floor. A elongated trough member 115 is rigidly mounted on an extension 116 which projects laterally from the guide means base 13, the trough member being carried by frame members 117 projecting upwardly from extension 116. The trough member is of V-shaped transverse cross-section, opening upwardly, and extends longitudinally in a straight line. As seen in FIG. 12, the trough member is inclined at the same angle as receptacle 20 when the latter is in the final position seen in FIG. 7. The trough member is disposed to underlie and support flow line 1, the flow line being nested within the trough as seen in FIG. 13. Since the receptacle is constrained to swing about the fixed axis defined by pins 65, and since trough member 115 extends away from the wallhead in a vertical plane at right angles to that axis, the end portion of the flow line comes automatically to rest in the trough member as the flow line is laid by movement of vessel 91 away from the well in the proper direction.

Through member 115 serves as a cradle which both supports the weight of the end portion of the flow line adjacent connector device 10 and prevents that portion of the flow line from moving laterally, in generally horizontal directions, under the action of water currents and other environmental forces to which the flow line is exposed. The overall effect of trough member 115 is therefore to prevent such movements of the end portion of the flow line as would apply excessive strains to connector device 10.

The apparatus embodiment of the invention described allows vertical installation of the flow line, with the end thereof extending vertically, utilizing an existing guide system for delivery of the flow line end to the well head, followed by adjustment of the flow line connection to a laterally extending position, relative to the wellhead, such adjustment resulting solely from the laying of the flow line on the marine floor. Diver assistance can be dispensed with completely and success of the method is, for practical purposes, not dependent upon the depth at which the wellhead is installed.

Though the invention has been described as practiced with the aid of a guide system employing cables or pipe extending from the operational base 12 to the well head 4, it is to be understood that any guide system can be employed which is suitable for accomplishing proper remote delivery of equipment from the operational base to the wellhead. Further, though the ability to use such a guide system, and thus eliminate diver assistance, constitutes an important advantage, it will be understood that the invention can be practiced without a guide system, the engagement of fitting 21 in receptacle 20 then being accomplished by a diver, when the depth of the installation is suitable. Various other changes and modifications can be made without departing from the scope of the invention as defined in the appended claims.

We claim:

1. The method for installing a flow line in connection with an underwater [well] installation [comprising a wellhead] located at a substantial distance below the surface of a body of water, comprising providing at the [wellhead] *underwater installation* a flow line connector including a stationary portion, having a duct [communicating with a well pipe] *with which the flow line is to be placed in communication*, and a flow line receptacle arranged for movement between an initial upright position and a laterally projecting position;

supporting the flow line on a vessel initially located at a position at least generally above the [wellhead] *underwater installation;* lowering an end portion of the flow line into said receptacle;

attaching the end of the flow line to said receptacle while the receptacle remains upright and the vessel supporting the flow line remains at said initial position;

laying the flow line on the floor of the body of water by moving the vessel [way] *away* from said initial position while paying out the flow line, descent of the end portion of the flow line toward the floor of the body of water causing said receptacle to swing to said laterally projecting position; and securing said receptacle rigidly to said stationary portion with [said] *the* flow line in communication with said duct.

2. The method for installing a flow line in connection with an underwater [well] installation [comprising a wellhead] located at a substantial distance below the surface of a body of water and equipped with a guide system for guiding [well] devices during travel between an operational base at the surface of the body of water and the [wellhead] *underwater installation*, comprising providing at the [wellhead] *underwater installation* a flow line connector including a stationary portion, having a duct [communicating with a well pipe] *with which the flow line is to be placed in communication*, and a flow line receptacle arranged for movement between an initial upright position and a laterally projecting position;

supporting the flow line on a vessel initially located at the operational base;

lowering the end of the flow line from the vessel to the [wellhead] area *of the underwater installation* and, employing the guide system, guiding the end of the flow line into said receptacle;

attaching the end of the flow line to said receptacle while the receptacle remains upright and the vessel supporting the flow line remains adjacent the operational base;

laying the flow line on the floor of the body of water by moving the vessel away from the operational base while paying out the flow line, descent of the end portion of the flow line toward the floor of the body of water causing said receptacle to swing to said laterally projecting position; and then securing said receptacle rigidly to said stationary portion with [said] *the* flow line in communication with said duct.

3. The method for installing a flow line in connection with an underwater well installation comprising a wellhead located at a substantial distance below the surface of a body of water and equipped with elongated guide means extending from the wellhead to an operational base at the surface of the body of water, comprising providing at the wellhead a flow line connector including a stationary portion, having a duct communicating with a well pipe, and a flow line receptacle arranged for movement between an initial upright position and a laterally projecting position;

supporting the flow line on a vessel initially disposed at the operational base;

detachably connecting the end of the flow line to the elongated guide means and causing said end of the flow line to descend along the guide means and engage in said flow line receptacle;

laying the flow line on the floor of the body of water by moving the vessel away from the operational base while paying out the flow line, descent of the end portion of the flow line from its initially upright position toward the floor of the body of water causing the flow line to be disconnected from the guide means and further causing said flow line receptacle to move to said laterally projecting position; and then securing said flow line receptacle rigidly to said stationary portion with the flow line in communication with said duct.

4. The method for installing a flow line in connection with [a wellhead] *an underwater installation* disposed at a substantial depth [under water] *in a body of water*, comprising providing at the [wellhead] *underwater installation* a movable flow line receptacle which occupies an initial upwardly opening position and is swingable to a laterally projecting position;

supporting the flow line on a vessel at [the] *an* operational base *generally above the underwater installation;* lowering an end of the flow line downwardly into said receptacle and securing the end of the flow line to [the] *said* receptacle;

laying the flow line on the floor of the body of water by moving the vessel away from the operational base while paying out the flow line and allowing the movement of the flow line toward the bottom of the body of water to swing said receptacle to its laterally projecting position; and securing said receptacle rigidly in said laterally projecting position.

5. In the installation of a flow line in connection with an underwater [well] installation [comprising a wellhead] located at a substantial distance below the surface of a body of water and equipped with elongated guide means extending from the [wellhead] *underwater installation* to an operational base at the surface of the body of water, the improvement comprising supporting the flow line at the surface of the body of water adjacent the operational base;

detachably connecting an end of the flow line to the elongated guide means and employing the guide means in causing the end of the flowline to descend to the [wellhead] *underwater installation;* securing the end of the flow line to the [wellhead] *underwater installation* while a substantial portion of the flow line extends upwardly therefrom; and then laying the flow line on the floor of the body of water, the movement of said substantial portion of the flow line from its upwardly extending position toward the floor of the body of water causing the flow line to be disconnected from [said] *the* elongated guide means.

6. The method for installing a flow line in connection with a wellhead disposed at a substantial depth under water, comprising providing at the wellhead a flow line connector having a stationary portion communicating with a well pipe supported by the wellhead and a movable connector unit swingable between an upright position and a laterally projecting position;

supporting the flow line on a vessel above the wellhead with the end portion of the flow line extending downwardly and connected to the movable unit of the flow line connector while maintaining the movable unit in upright position;

laying the flow line on the floor of the body of water by moving the vessel away from the location of the wellhead while paying out the flow line and allowing the movement of the flow line toward the floor of the body of water to swing said movable connector unit to its laterally projecting position; and securing said movable connector unit in said laterally projecting position.

7. In a connector for use in connecting a flow line to [a wellhead installed] *an installation located* a substantial distance below the surface of a body of water, the combination of a stationary connector structure having a flow duct [connectable to a well pipe supported by the wellhead] *with which the flow line is to be placed in communication;* a connector body member having a through passage;

means mounting said body *member* for swinging movement, relative to said stationary connector structure, between a first position, in which the axis of said through passage extends across the axis of said flow duct and one end of said through passage opens upwardly, and a second position, in which the other end of said passage opens toward said duct, said connector body member including means whereby an end of a flow line lowered through the water from above the [wellhead] *installation* can be secured to said connector body member when said connector body member is in said first position; and lock means for securing said stationary connector structure and said connector body member rigidly together after the flow line has been secured to said connector body member and said connector body member has been swung to said second position.

8. A connector according to claim 7, wherein said connector body member is pivotally mounted on said stationary connector structure.

9. A connector according to claim 7, wherein said stationary connector structure includes two spaced leg portions projecting therefrom generally axially of said flow duct, and said connector body member is located between said leg portions and mounted thereon for pivotal movement about an axis extending transversely of said flow duct, said stationary connector structure and said connector body member having concave and convex surface portions, respectively, disposed in proximity to each other when said receptacle occupies said second position.

10. A connector according to claim 7, wherein said means whereby an end of a flow line can be secured to said connector body includes internal shoulder means facing toward said one end of said passage and adapted to be engaged by a flow line fitting, and latch means adapted to coact with cooperating latch means on the flow line fitting, to latch the fitting to said connector body, when the fitting engages said shoulder means.

11. A connector according to claim 10, wherein said stationary connector structure comprises a stationary body member having a cylindrical chamber, a tubular member fixed to said stationary body member and defining said flow duct, said tubular member extending within said chamber from one end thereof and toward said connecting body member when the latter is in said second position, the portion of said tubular member within said chamber being shorter than said chamber, and a piston member disposed in said chamber and slidably embracing said tubular member and slidably engaging the wall of said chamber, said piston member being movable between a fully retracted position, allowing swinging movement of said connector body member relative to said stationary connector structure, and a projected position, for engagement in said connector body member when the latter is in said second position.

12. Apparatus for underwater well completion comprising, in combination, a wellhead installed at a substantial distance below the surface of a body of water and supporting at least one well pipe which depends into the well;

a flow line connector mounted at said wellhead and comprising a stationary connector unit having a flow duct communicating with said well pipe, and a movable connector unit having a through passage and mounted for swinging movement relative to said stationary connector unit between a first position, in which one end of said passage is directed upwardly, and a second position, in which the other end of said passage opens toward said flow duct;

a flow line to be connected to said wellhead and laid along the floor of the body of water;

connector means attached to one end of said flow line;

an operational base located at the surface of the body of water above said wellhead;

a guide system for guiding objects from said operational base to said wellhead and whereby said end of said flow line can be guided, as the same is lowered from said operational base, into a position wherein said connector means is operatively engaged with said movable connector unit when the latter is in said first position, subsequent laying of said flow line along the floor of the body of water causing said movable connector unit to swing to said second position; and remotely operated means for locking said movable connector unit and said stationary connector unit together, with said flow line communicating with said duct, when said movable connector unit is in said second position.

13. Apparatus according to claim 12, wherein said guide system comprises a plurality of elongated guide elements extending from said wellhead to said operational base, and a guide unit slidably engaged with said guide elements, said one end of said flow line being releasably attached to said guide unit, laying of said flow line along the floor of the body of water causing said one end of said flow line to be released from said guide unit.

14. Apparatus according to claim 12, wherein said connector means is constructed and arranged for downward insertion into said through passage, said connector means and said movable connector unit having cooperating latch means for securing said connector means to said movable connector unit.

15. Apparatus according to claim 14, wherein said stationary connector unit includes a hollow cylindrical member movable between a fully retracted position, allowing swinging movement of said movable connector unit relative to said stationary connector unit, and a projected position in which said cylindrical member engages said connector means when said movable connector unit is in said second position.

16. In an underwater well installation of the type comprising a wellhead installed at a substantial depth beneath the surface of a body of water and supporting a well pipe which depends into the well for production of well fluid therefrom, and production conduit means communicating with the well pipe to convey well fluid therefrom, the improvement comprising a stationary connector structure having a flow duct;

means mounting said connector structure adjacent the wellhead, one end of said flow duct communicating with the production conduit means, the other end of said flow duct opening outwardly away from the wellhead;

a connector body member having a through passage;

means mounting said connector body member for swinging movement between a first position, in which the axis of said through passage extends across the axis of said flow duct and one end of said through passage opens upwardly, and a second position, in which the other end of said through passage is immediately adjacent and opens toward said other end of said flow duct of said stationary connector structure; and lock means for securing said stationary connector structure and said connector body member rigidly together when said connector body member is in said second position, said connector body member including means whereby an end of a flow line lowered through the water from above the wellhead can be secured to said connector body member when the same is in said first position, laying of the flow line out on the floor of the body of water then being effective to swing from said first position to said second position, in which position the flow line can communicate with said flow duct.

17. The method for installing a flow line in connection with [a wellhead] *an installation* disposed at a substantial depth under water, comprising providing at the [a wellhead] *underwater installation* a stationary flow line connector having a duct [communicating with a well pipe supported by the wellhead] *with which the flow line is to communicate,* and a movable connector unit swingable between an upright position and a laterally projecting position;

supporting the flow line on an operational base above the [wellhead] *underwater installation* with an end portion of the flow line extending downwardly and connected to the movable connector unit while maintaining the movable unit in its upright position;

swinging the movable connector unit to its laterally projecting position; and securing said movable connector unit in said laterally projecting position with said end portion of the flow line communicating with said duct of the stationary flow line connector.

18. Apparatus for use in connecting a flow line to a wellhead installed a substantial distance below the surface of a body of water comprising a stationary connector structure having a flow duct connected to a well pipe supported by the wellhead, said flow duct extending laterally of the wellhead;

a movable connector unit;

said movable connector unit including means securing a downwardly projecting end portion of a flow line extending from above the wellhead to the movable connector unit;

means mounting said movable connector unit on said wellhead for swinging movement relative to said stationary connector structure from a first position in which the movable connector unit and the downwardly projecting end portion of the flow line connected thereto are in an upright position, to a second position in which said end portion of the flow line and said movable connector unit extends laterally of the wellhead and the movable connector unit is generally aligned with said flow duct; and lock means for securing said stationary connector structure and said movable connector unit rigidly together with the end portion of the flow line communicating with said duct.

References Cited

The following references, cited by the Examiner, are of record in the patented file of this patent or the original patent.

UNITED STATES PATENTS

| | | | |
|---|---|---|---|
| 1,828,124 | 10/1931 | Bower | 166—92 |
| 2,676,787 | 4/1954 | Johnson | 175—7 |
| 3,025,912 | 3/1962 | Schramm et al. | 166—.5 X |
| 3,041,090 | 6/1962 | Ashe et al. | 166—.5 X |
| 3,052,299 | 9/1962 | Geer et al. | 166—.6 |
| 3,186,487 | 6/1965 | Geer et al. | 166—.5 |
| 3,219,116 | 11/1965 | Matthews | 166—.5 |
| 3,226,728 | 12/1965 | Walvoord | 166—.5 |
| 3,233,667 | 2/1966 | Van Winkle | 166—.6 |
| 3,260,270 | 7/1966 | Watkins et al. | 166—.5 X |
| 3,339,632 | 9/1967 | Lewis | 166—.6 |

CHARLES E. O'CONNELL, Primary Examiner

R. E. FAVREAU, Assistant Examiner

U.S. Cl. X.R.

285—18